A. J. MACY.
STABILIZING CONTROL FOR AEROPLANES.
APPLICATION FILED MAR. 25, 1916.
1,326,945. Patented Jan. 6, 1920.
5 SHEETS—SHEET 3.
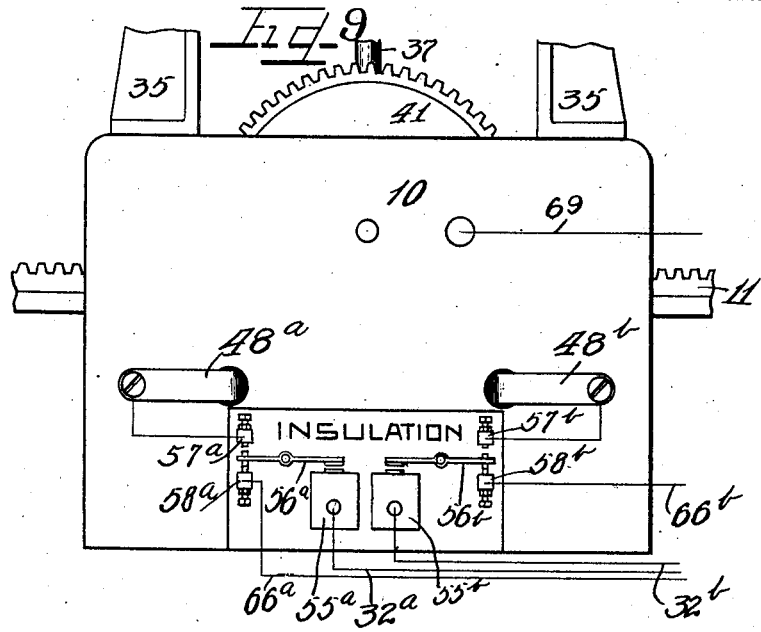
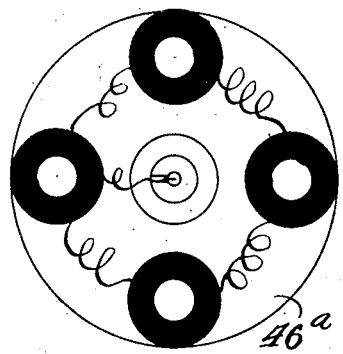
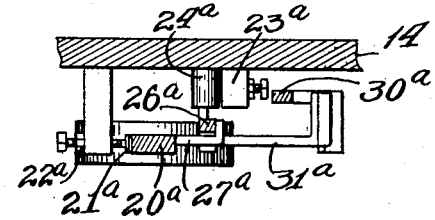
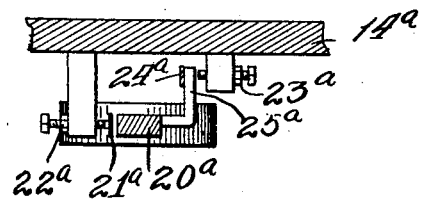

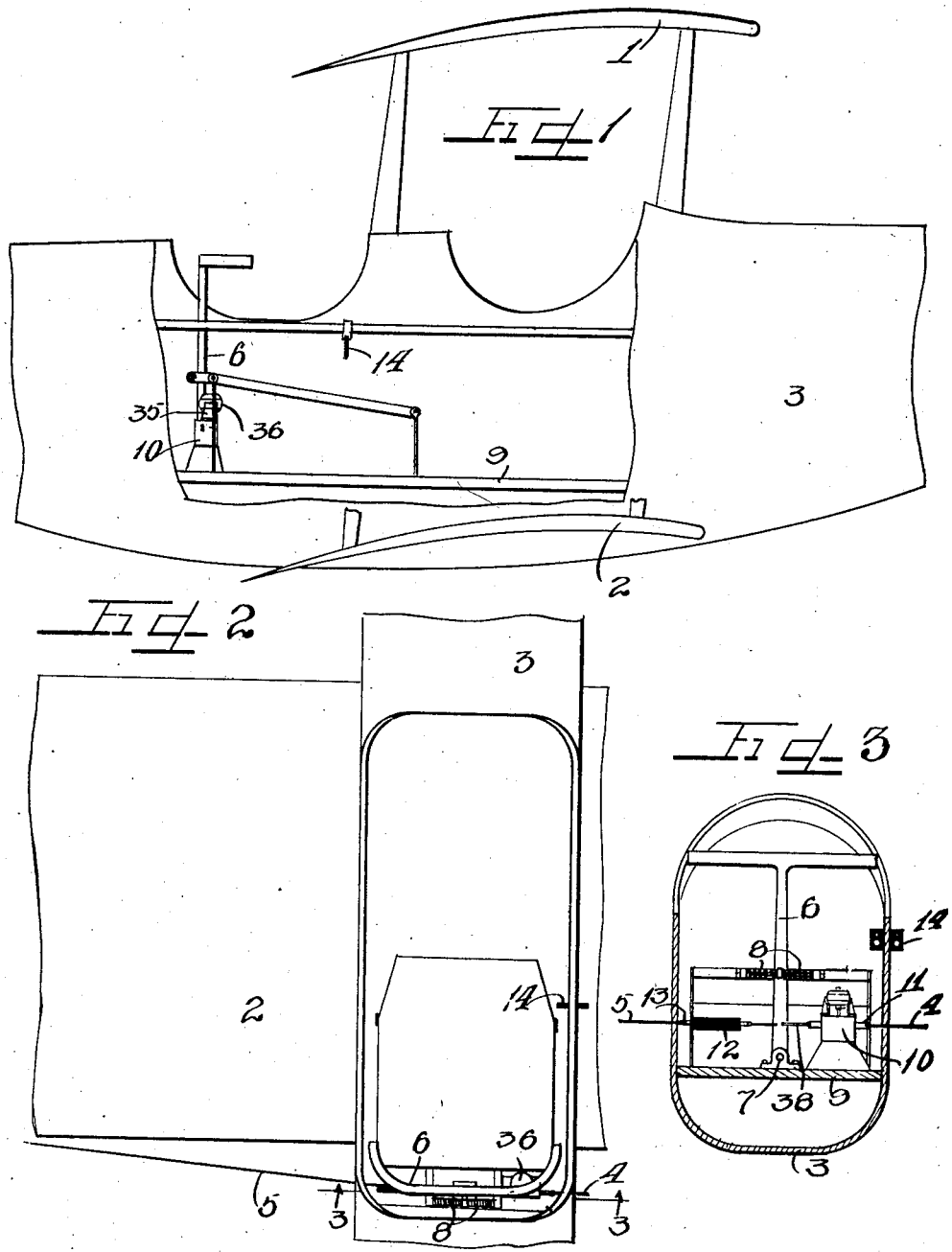

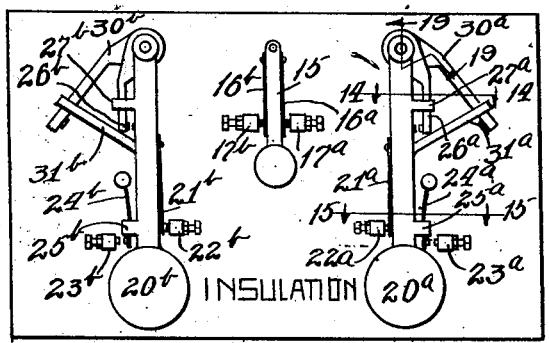
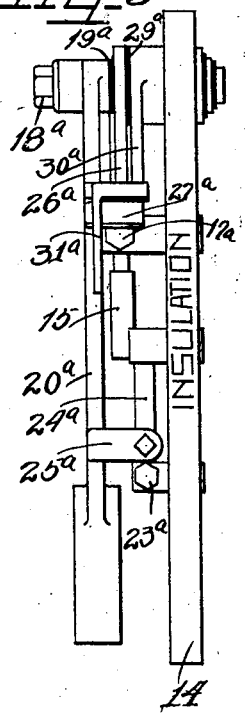
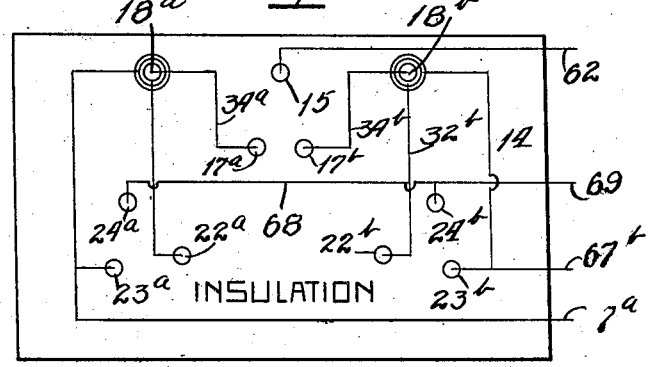
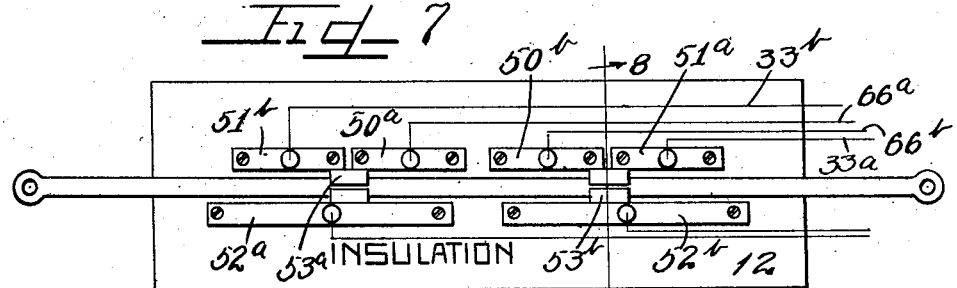

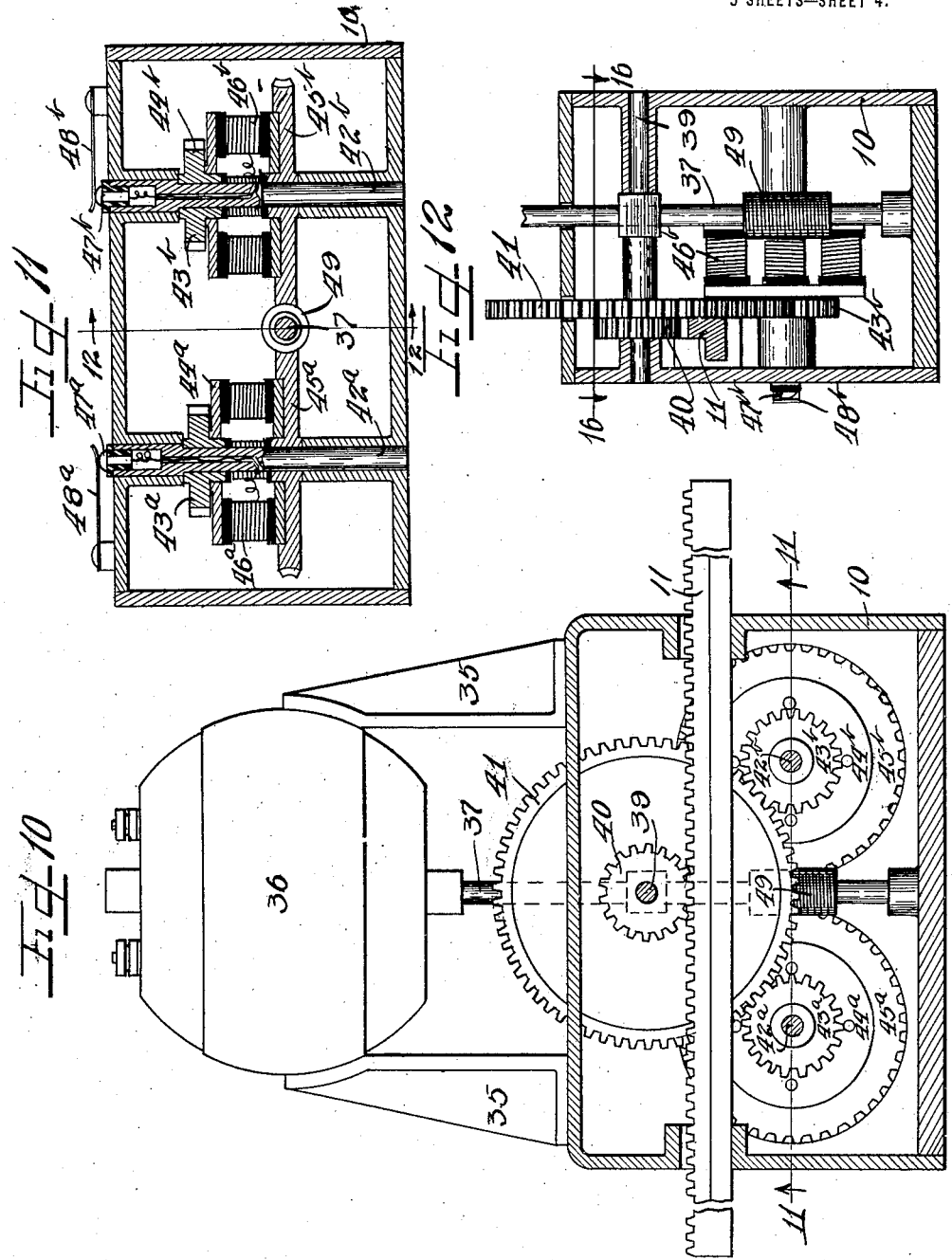

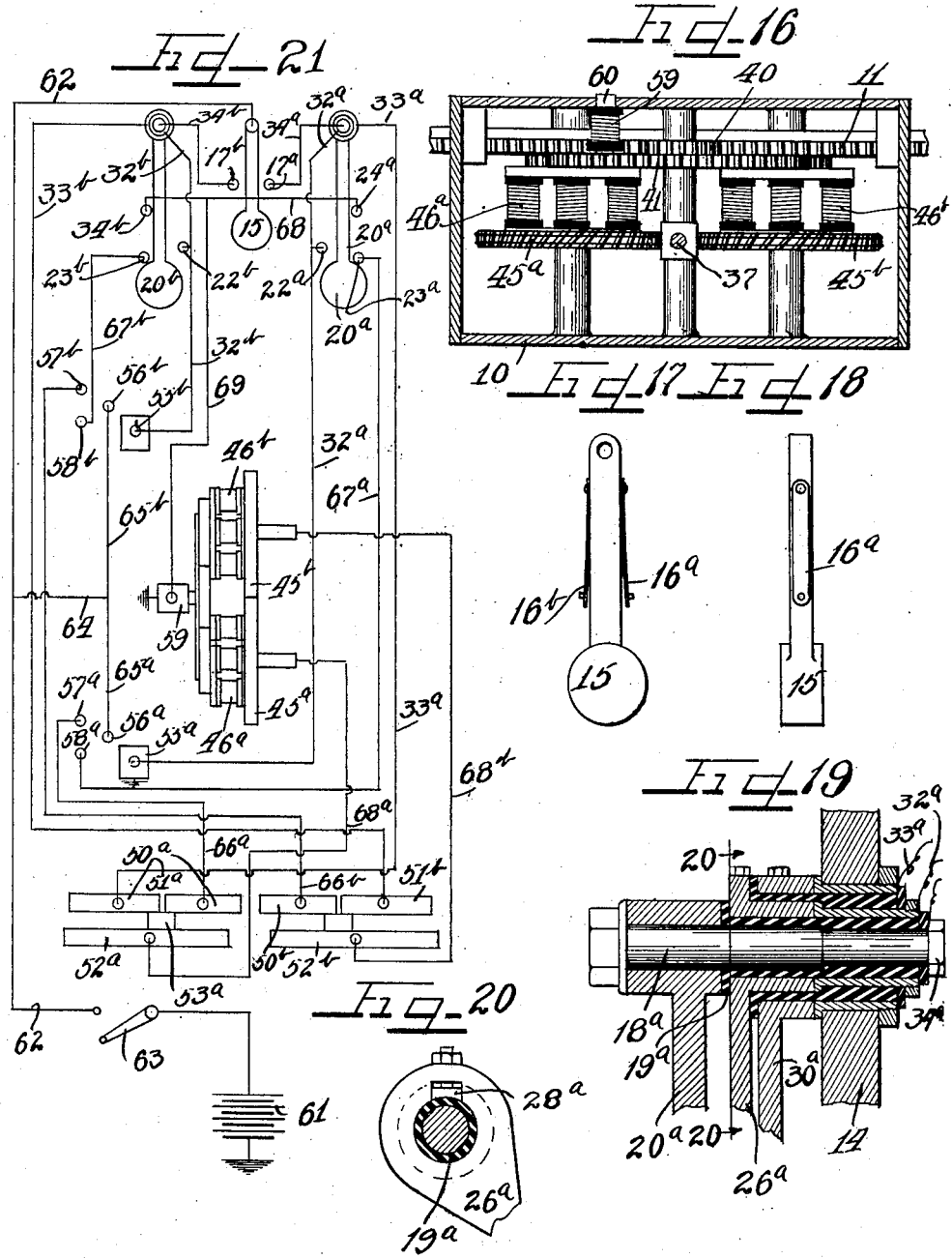

UNITED STATES PATENT OFFICE.

ALFRED J. MACY, OF CHICAGO, ILLINOIS, ASSIGNOR TO MACY ENGINEERING COMPANY, OF FRANKLIN, PENNSYLVANIA, A CORPORATION OF MAINE.

STABILIZING CONTROL FOR AEROPLANES.

1,326,945.  Specification of Letters Patent.  Patented Jan. 6, 1920.

Application filed March 25, 1916. Serial No. 86,612.

*To all whom it may concern:*

Be it known that I, ALFRED J. MACY, a citizen of the United States, and a resident of the city of Chicago, in the county of Cook and State of Illinois, have invented certain new and useful Improvements in Stabilizing Controls for Aeroplanes; and I do hereby declare that the following is a full, clear, and exact description of the same, reference being had to the accompanying drawings, and to the numerals of reference marked thereon, which form a part of this specification.

This invention relates to a mechanism for adaptation to an aeroplane for actuation of the controls thereof, in particular the lateral controls which may be used by the operator to tilt the aeroplane about its longitudinal axis from or to an even keel, and acting, when operating automatically, to maintain the aeroplane upon an even keel or at an angle about its longitudinal axis. This effect is gained by operation of the ailerons or other surfaces by which the lateral stability of the aeroplane is controlled, and the mechanism is so constructed that in correcting a lateral deflection of the aeroplane, the controls are released at a time to avoid over-control of the machine, or in other words, obviate a tendency to cause a tilt of the aeroplane beyond normal in an opposite direction.

It is an object therefore of this invention to construct a device for adaptation to an aeroplane to be connected to the actuating means for the lateral controls of the aeroplane whereby the same may be automatically operated to maintain the aeroplane on an even keel or at a banking angle, as, for instance, when a turn is being made in midair.

It is also an object of this invention to construct an apparatus adapted to operate automatically to actuate the lateral controls of an aeroplane, and to correct deflections or tilting of the aeroplane about its longitudinal axis, and yet acting automatically to maintain the aeroplane at a correct banking angle, as during a spiral ascent or descent or in making a turn.

It is also an object of this invention to construct a device embodying an instrument board having gravity acting depending levers thereon and suitably provided with electrical contacts, whereby the aeroplane on which the device is mounted, is tilted about its longitudinal axis, causing closure and opening of certain electrical circuits to set in operation positively driven mechanisms for operating the controls of the aeroplane to correct such deflection thereof and restore the same to normal without over-control by utilizing the momentum of the plane in its return movement.

It is furthermore an object of this invention to construct an apparatus for attachment upon a vehicle to correct deviations in movement of the vehicle from a proper attitude of movement, utilizing for the purpose electrical circuits adapted to be automatically closed to energize magnetic clutches which are positively driven to drive the controlling means of the vehicle in a manner to restore the vehicle to its proper attitude of motion, and furthermore opening to release the controlling means at a time during the return movement of the vehicle to obviate over-control, or, in other words, prevent the momentum of the return movement of the vehicle carrying the same beyond its proper or normal attitude of flight.

It is finally an object of this invention to construct an improved automatically operating device for adaptation to an aeroplane to correct lateral deflections in attitude of movement thereof from normal by operation of the controlling means, and yet operating automatically to permit the aeroplane to fly at an angle, maintaining the same in such an attitude when necessary.

The invention (in a preferred form) is illustrated in the drawings and hereinafter more fully described.

In the drawings:

Figure 1 is a fragmentary side elevation of the body of an aeroplane broken away to show the connection therewith of a device embodying the principles of my invention.

Fig. 2 is a fragmentary top plan view with parts omitted, of the mechanisms illustrated in Fig. 1.

Fig. 3 is a detail section on line 3—3 of Fig. 2.

Fig. 4 is a front elevation of the instrument board of my apparatus.

Fig. 5 is an edge view thereof.

Fig. 6 is a rear elevation of said board, showing the wiring.

Fig. 7 is a plan view of a switch mechanism forming a part of the apparatus.

Fig. 8 is a sectional detail on line 8—8 of Fig. 7.

Fig. 9 is a fragmentary rear elevational view of the casing containing the motor driven magnetic clutches.

Fig. 10 is a front elevational view thereof, with the casing broken away and in section to show the interior mechanisms.

Fig. 11 is a sectional detail taken on line 11—11 of Fig. 10, with parts shown in elevation.

Fig. 12 is a fragmentary detail section taken on line 12—12 of Fig. 11, with parts shown in elevation.

Fig. 13 is a diagrammatic view of one of the magnetic clutches, showing the wiring thereof.

Fig. 14 is a fragmentary detail section taken on line 14—14 of Fig. 4, with parts shown in elevation.

Fig. 15 is a similar section taken on line 15—15 of Fig. 4.

Fig. 16 is a detail sectional view taken on line 16—16 of Fig. 12, with parts shown in elevation.

Fig. 17 is a detail front view of the central gravity acting lever of the board shown in Fig. 4.

Fig. 18 is a side view thereof.

Fig. 19 is a detail section taken on line 19—19 of Fig. 4.

Fig. 20 is a detail section taken on line 20—20 of Fig. 19, with parts omitted.

Fig. 21 is a wiring diagram of the apparatus.

As shown in the drawings:

The aeroplane consists of upper and lower surfaces 1 and 2, respectively, with a body 3, shown fragmentarily, mounted therebetween, and within which the power plant and operating mechanisms for the controls of the aeroplane are situated. The lateral controls of ailerons (not shown) are operated by cables, that for the right wing of the aeroplane denoted by the reference numeral 4, and that for the left wing by the reference numeral 5. These cables lead into the operating compartment in the body 3, and are connected, as hereinafter described, to an upright shoulder piece or lever 6, which is secured upon a pivot 7, journaled longitudinally in the body 3, permitting said lever to be oscillated by the shoulders of an operator seated within the body to thereby operate the controlling cables 4 and 5. The oscillating movement of the lever 6, is resisted by coiled springs 8, mounted on each side thereof, as clearly shown in Fig. 3, said springs normally acting to return said lever 6, to central upright position, actuating the cables 4 and 5, therewith, after the same have been actuated and released.

At one side of said upright lever 6, mounted upon the floor 9, on which said lever is pivoted, is a casing 10, through which a rack bar 11, extends with one of its ends connected to the cable 4, and the other linked to the lever 6, and on the opposite side of said lever 6, the insulating base 12, of a switch element is shown, and connected to the cable 5, is one end of a switch bar 13, with its other end linked to said lever 6. Mounted transversely of the body 3, and at one side thereof, is a lateral control instrument board 14, constructed of insulating material, an enlarged view of which is shown in Figs. 4 and 5. Pivotally mounted upon the front surface of said lateral control instrument board, is a small centrally disposed gravity acting or main lateral control plumb lever 15, having on each edge thereof a resilient contact member 16$^a$ and 16$^b$, respectively, each adapted to contact one of the terminals 17$^a$ and 17$^b$, respectively, provided on said lateral control board, one on each side of the main lateral control plumb lever.

Said lateral control instrument board is also provided with two similar gravity acting secondary plumb contact levers for the electrical circuits which control the operation of the right and left lateral controlling means of the aeroplane. The operation of the mechanisms associated with one of said secondary plumb contact levers is exactly similar and identical in every respect with that of the other secondary lever, and for convenience of illustration and description, those mechanisms for the control of the right wing of the aeroplane are denoted by reference numerals having the sub-letter "a" appended thereto, and those mechanisms for the left wing are denoted by the same reference numerals having the sub-letter "b" appended thereto.

Secured in said lateral control instrument board 14, and insulated therefrom, are pintle bolts 18$^a$ and 18$^b$, a detail of one of which is shown in Fig. 19, and surrounding each thereof are insulating sleeves 19$^a$ and 19$^b$, respectively. Pivotally hung on the outer end of each of the bolts and in electrical contact therewith, are gravity acting secondary plumb contact levers 20$^a$ and 20$^b$, respectively. Secured on the inner edge of each of the secondary levers 20$^a$ and 20$^b$, are resilient contact members 21$^a$ and 21$^b$, respectively, and mounted upon the lateral control board 14, are adjustable terminal posts or contacts 22$^a$ and 22$^b$, respectively, normally contacted by said members 21$^a$ and 21$^b$, respectively. Also mounted upon the lateral control board 14, at the other side of each of the secondary gravity acting levers, though not projecting outwardly from the board as far as the secondary levers, are adjustable terminal contacts 23$^a$ and 23$^b$, respectively, each adapted to be contacted by the lever end of resilient contact elements 24$^a$ and 24$^b$, respectively, also mounted on the instrument board, but normally retained from contact with said terminals 23$^a$ and 23$^b$, by L-shaped extensions 25$^a$ and 25$^b$, respectively, provided on the secondary gravity acting levers.

Frictionally journaled on each of the insulating sleeves 19$^a$ and 19$^b$, are contact levers 26$^a$ and 26$^b$, respectively, which project downwardly substantially parallel to and at one side of the secondary gravity acting levers, and at their lower ends are each provided with a contact point adapted to close against a contact point provided on said levers, and angled L-shaped extensions 27$^a$ and 27$^b$, respectively, are provided on said secondary gravity acting levers to project over said depending levers 26$^a$ and 26$^b$, to permit movement thereof toward, but to limit the movement away from, the gravity acting levers. Each of said contact levers 26$^a$ and 26$^b$, is provided with a friction shoe, a detail of which is shown in Fig. 20, denoted by the reference numeral 28$^a$, adapted to bear upon the insulating sleeve, and adjustable by means of a threaded bolt and nut for the purpose to increase or decrease the friction, so that there is a tendency for said contact levers to move with said lateral control instrument board 14, when the same moves as a whole with the body of the aeroplane. Surrounding the hub extension of each of the contact levers 26$^a$ and 26$^b$, are insulating sleeves 29$^a$ and 29$^b$, respectively, extending through said instrument board 14, and journaled on said sleeves are contact levers 30$^a$ and 30$^b$, respectively, also provided with friction shoes similar to those described, and which also tend to move with said board, due to their frictional pivotal engagement with the insulating sleeves. Formed on each of the secondary gravity acting levers 20$^a$ and 20$^b$, are long extensions 31$^a$ and 31$^b$, respectively, adapted to engage over the ends of the contact levers 30$^a$ and 30$^b$, to limit the distance of separation thereof from said secondary gravity acting levers, and yet permitting said contact levers moving with the lateral control board 14, to approach and contact said secondary gravity acting levers. As clearly shown in the detail view in Fig. 19, metallic conductor sleeves are provided for the respective levers 26$^a$ and 26$^b$, and 30$^a$ and 30$^b$, and connected to said conductor sleeves are wires 32$^a$ and 32$^b$, 33$^a$ and 33$^b$, respectively, and to the pivot bolts 18$^a$ and 18$^b$, are connected the respective wires 34$^a$ and 34$^b$.

Referring next to the magnetic clutches and means for actuating the control lever 6, mounted in brackets 35, on the upper end of the casing 10, is a motor 36, having its vertically disposed motor shaft 37, extending downwardly into the casing 10. Said rack bar 11, which extends slidably through the casing 10, is connected by means of a link 38, with the upright lever 6. Journaled within the casing 10, is an idler shaft 39, on which is secured a pinion 40, meshing with the teeth of the rack bar 11, and having also rigidly secured thereon a large gear 41, the upper portion of which extends beyond the walls of the casing through a slot provided therefor.

Also journaled within the casing 10, are shafts 42$^a$ and 42$^b$, respectively, each provided with a pinion, one denoted by the reference numeral 43$^a$, and the other denoted by the reference numeral 43$^b$, and both meshing with the gear 41. Rigidly secured or connected in any manner to said respective pinions 43$^a$ and 43$^b$, are magnetic disks 44$^a$ and 44$^b$, respectively. Keyed upon said respective shafts 42$^a$ and 42$^b$, are worm wheels 45$^a$ and 45$^b$, respectively, and secured upon a disk recessed into each of said worm wheels are a plurality of magnetic coils, those for one of the gears denoted by the reference numeral 46$^a$, and those for the other gear denoted by the reference numeral 46$^b$, said coils, when magnetized, adapted to attract the disks 44$^a$ and 44$^b$, that is, either one or the other thereof, as the case may be, to cause the same and the pinion associated therewith to rotate with the respective worm wheel.

One terminal of each group of coils which are connected in parallel for the respective worm gears 45$^a$ and 45$^b$, is grounded and the other led through an axial recess in its shaft and outwardly to a contact button or pin, which, for the respective shafts, are denoted by the reference numerals 47$^a$ and 47$^b$, respectively, and are secured into and insulated from the ends of said shafts. Mounted upon the exterior of the casing are brushes 48$^a$ and 48$^b$, respectively, which bear upon the terminals in the ends of the respective shafts. Mounted on or forming a part of the vertical shaft 37, which extends through the casing, is a worm 49, meshing with both of the worm wheels 45$^a$ and 45$^b$, to thereby rotate the same in opposite directions.

Mounted upon the insulating switch board 12, shown in Figs. 2, 3 and 7, are two sets of contacts, one comprising the contacts 50$^a$, 51$^a$, and 52$^a$, and the other set consisting of contacts 50$^b$, 51$^b$, and 52$^b$, between which the insulating switch bar 13, mentioned, moves. Two brushes are secured upon said switch bar 13, the one brush denoted by the reference character 53$^a$, and the other by the reference character 53$^b$, and a coiled spring is provided between the two parts of each brush to impel the same apart into close contact with the contact elements on each side thereof, said spring also acting as a conductor between the respective parts of the brush.

Mounted upon the front surface of the casing 10, is an insulating board 54, and mounted on said board are relay coils 55$^a$ and 55$^b$, respectively. Each of said relays is provided with a pivoted armature bar denoted by the reference characters 56$^a$ and 56$^b$, respectively, each of which is normally in contact with a terminal 57$^a$ and 57$^b$, respectively, but when the relay coils are energized adapted to be swung out of contact therewith into contact with terminals 58$^a$ and 58$^b$, respectively.

A magnetic brake is also provided for contact with the large gear 41, to hold the same from rotation, and for this purpose a solenoid coil 59, is mounted on the interior of the casing and provided with an armature 60, adapted when the coil is energized, to be impelled into contact with the surface of said gear. One terminal of said coil is grounded, and the other connected into an electric circuit hereinafter described.

Referring to Fig. 21, which is a diagram of the electric circuits of the apparatus, any source of E. M. F., such as a battery or generator, is denoted by the reference numeral 61, one terminal of which is grounded, and the other terminal of which has connected thereto a main line wire 62, provided with a switch 63. Said main line wire 62, is connected directly to the central main gravity acting lever 15, and a branch 64, from said main line wire is connected to wires 65$^a$ and 65$^b$, respectively, leading to the pivoted armature levers of the relays. The ungrounded terminal of the coil of the relay 55$^a$, has connected thereto the wire 32$^a$ leading to the lever 26$^a$, and similarly the coil of the relay 55$^b$, has connected thereto the wire 32$^b$ leading to the lever 26$^b$. The terminals 57$^a$ and 57$^b$, of the relays, are connected by means of wires 66$^a$ and 66$^b$, to the contact elements 50$^a$ and 50$^b$, respectively, and the other relay contacts 58$^a$ and 58$^b$, respectively, are connected by means of wires 67$^a$ and 67$^b$, to the contact terminals 23$^a$ and 23$^b$, respectively, on the lateral control board. The armature bars 56$^a$ and 56$^b$, respectively, are normally in contact with the contacts 58$^a$ and 58$^b$, and when the relays are energized, swing into contact with the respective contacts 57$^a$ and 57$^b$. Connected to the other switch contact elements 51$^a$ and 51$^b$, are the leads 33$^a$ and 33$^b$, respectively, leading to the levers 30$^a$ and 30$^b$ respectively.

A wire 68$^a$, leads from the contact terminal 52$^a$, to the resilient brush 48$^a$, for the magnetic clutch 46$^a$, and similarly a wire 68$^b$, leads from the contact element 52$^b$, to the resilient brush 48$^b$, for the magnetic clutch 46$^b$. The resilient terminal members 24$^a$ and 24$^b$, are connected to one another by a wire 68, and leading therefrom is a wire 69, which is connected to the terminal of the brake coil 59.

The operation is as follows:

When a tilting of the aeroplane about its longitudinal axis begins, that is, resulting in a depression of the right wing and an elevation of the left wing for instance, the lateral control instrument board 14, will be tilted in a clockwise direction, referring to Fig. 4, so that the central main gravity acting lever 15, maintaining, as it does, its vertical position, will receive moved into contact therewith the terminal 17$^a$. A circuit will thus be established through the main plumb lever 15, contact terminal 17$^a$, wire 34$^a$ secondary lateral control gravity acting lever 20$^a$, resilient contact member 21$^a$, terminal 22$^a$, with which the same remains in contact as the board is tilted, wire 32$^a$, to relay 55$^a$, thence by ground to battery 61, thence through switch 63, and main lead wire 62, to gravity acting lever 15. The current through the relay 55$^a$, causes the same to be energized, thus moving the armature bar 56$^a$, into contact with the terminal 57$^a$, and a secondary circuit is set up from the source of E. M. F. 61, through switch 63, main lead wire 62, branch wire 64, wire 65$^a$, relay armature bar 56$^a$, contact 57$^a$, wire 66$^a$, contact element 50$^a$, brush 53$^a$, contact element 52$^a$, wire 68$^a$, to clutch 46$^a$, thence by ground returning to battery 61. The energizing of the clutch 46$^a$, of course causes the gear mechanisms to rotate, whereby the rack bar lateral control and consequently the control lever 6, of the aeroplane is shifted to manipulate the controls thereof.

The tilt of the aeroplane will thus be corrected, and as the same returns to normal flying attitude, the board 14, of course moves therewith, thus causing the contact terminal 17$^a$, to retreat from the main gravity acting lever 15$^a$, breaking the circuit to the relay 55$^a$, so that the armature thereof is released, thus breaking the secondary circuit to the clutch 46$^a$, so that actuation thereof ceases and the springs 8, on the control lever of the aeroplane serve to return the controls to normal position. The momentum of the aeroplane continues the movement thereof back to normal, even though the release of the controls takes place prior to the time at which the aeroplane resumes its normal attitude. Thus over-control or tilting of the aeroplane in an opposite direction, due to over-manipulation of the controlling means, is avoided.

Assume that the aeroplane is again tilted, that is, the right wing depressed, and the left wing elevated a greater amount than assumed in the preceding instance, then the movement of the lateral control instrument board 14, will again take place, but to a greater degree. This movement of greater magnitude will, as stated, cause movement of the lateral control instrument board 14, with the aeroplane, so that the contact 17ª, approaches the main gravity acting lever 15, closing against the resilient contact member 16ª, thereof, and during the first portion of the deflection of the aeroplane, the same series of operations take place as already described. However, in view of the fact that the tilt or deflection of the aeroplane is of greater magnitude than in the preceding instance, a further operation of the mechanisms will take place. The resilient contact member 21ª, will break contact with the terminal 22ª, as the same recedes therefrom, thus deënergizing the relay 55ª, while on the other hand the pivoted arm 26ª, which has frictional engagement with its pivot in the lateral control board 14, and moving as it does with said board 14, will close contact with the secondary gravity acting right lateral control lever 20ª, and as a consequence a circuit will be established from the arm 26ª, through the wire 32ª, through the relay 55ª, to again energize the same, thence by ground to source of E. M. F. 61, thence by main lead wire 62, to main gravity acting lever 15, through contact 17ª, wire 34ª, secondary right lateral control lever 20ª, to lever 26ª.

The relay 55ª, thus being energized, will cause movement of the relay armature bar, so that the same contacts the terminal 57ª, closing the circuit from the source of E. M. F. 61, through the wire 66ª, contact element 50ª, brush 53ª, contact element 52ª, wire 68ª, to magnetic clutch 46ª, and thence by ground to source of E. M. F. 61, so that the controls of the aeroplane will be manipulated a further degree than in the preceding instance, by movement of the gears from the magnetic clutch 46ª. Thus the aeroplane controlling means actuated by the cables 4 and 5, will be kept in movement beyond that point at which it was arrested in the first instance described. This will finally cause the brush 53ª, to move off of the contact element 50ª, so that an intermittent making and breaking of the circuit will take place as long as the relay is energized to hold the controls substantially at an adjusted position.

Finally, however, the aeroplane will begin a return tilting movement, moving the lateral control board 14, therewith, and this causes the arm 26ª, to swing out of contact with the right lateral control lever 20ª, immediately breaking the circuit to the relay, causing the armature 56ª, to swing into contact with 58ª, and deënergizing the clutch 46ª. The movement of the armature 56ª, into contact with the point 58ª, however, closes the brake circuit from point 23ª, wire 67ª, point 58ª, armature 56ª, wire 65ª, wire 64, wire 62, source of E. M. F. 61, ground to brake coil 59, wire 69, wire 68ª, to point 24ª. The actuation of the brake of course serves to lock the mechanisms in an adjusted position, whereby the controls are held rigid against the stress of the springs 8, of the controlling lever while the plane is on its return movement from tilted position to normal.

As the aeroplane returns farther toward normal, the terminal contact 23ª, will recede from the contact 24ª, sufficient to break the circuit, thus breaking the circuit to the brake 59. The springs 8, will then operate instantly to restore the controls to normal position. Closure of the contact 22ª, by resilient element 21ª, will next take place just before the machine reaches normal to close the magnetic clutch circuit for the time being but the momentum of the aeroplane, returning under the effect of the brake held controls, will have made the effect of actuation of the controls due to closure of the contact 22ª, entirely negligible.

The next consideration is a tilting of the aeroplane of still greater magnitude than the first two instances described, and one that cannot be adequately arrested nor rapidly enough by movement of the controls in a manner and to such a limit as described in the first two instances. Assume the first and second parts of the operation of the apparatus to have taken place, so that the tilting of the aeroplane beyond extreme movement of the instances described continues, and of course movement of the instrument board 14, therewith. Under such conditions, the arm 26ª, is in contact with the gravity acting lever 20ª, and the terminal 17ª, is in contact with the gravity acting lever 15, and the brush 53ª, is at an extreme end of the contact element 50ª. In view of the magnitude of deflection of the aeroplane from normal, however, the adjustment of the controls effected by such a position of the parts of the controlling apparatus is insufficient to restore the aeroplane to normal position or arrest the movement of the plane, and as the tilting angle becomes greater and the board moves therewith, the frictional arm 30ª, will be moved downwardly with the board 14, to contact the gravity acting lever 20ª. A circuit will now be established from the source of E. M. F. 61, the main lead wire 62, gravity acting lever 15, contact 17ª, wire 34ª, gravity acting lever 20ª, frictional arm 30ª, through wire 33ª, to contact element 51ª, brush 53ª, contact element 52ª, wire 68ª, to magnetic clutch 46ª, and the movement of the brush 53ª, along with the switch bar 13, out of contact with the contact element 50ª, will have no influence upon the circuit, the current passing through the contact element 51ª, brush 53ª, and contact element 52ª. The current leaves the magnetic clutch element 46ª, by ground and returns to the source of E. M. F. 61, thence through the main lead wire 62, to gravity acting lever 15, through the same to contact 17ª, and thence by wire 34ª, to frictional arm 30ª. The clutch is therefore operating independent of the relay 55ª, and will continue to operate until the brush 53ª, slides off and out of contact with the element 51ª, this being the point of limiting adjustment of the aeroplane controls. At this point the springs 8, on the control lever of the aeroplane will tend to restore the aeroplane controls to normal, thus moving the brush 53ª, back into contact with the elements 51ª and 52ª, and thus energizing the clutch 46ª, to again operate the controls and shift said brush out of contact, and this making and breaking of the circuit at the limiting position of the parts continues until the aeroplane begins its return tilting movement to normal attitude.

Of course, during a return movement of the board 14, the various mechanisms thereon are operated to close certain of the electrical circuits in the same manner and in the same sequence as described with reference to the operation during the returning movement in the first two instances cited, so that manipulation of the controls will take place until the aeroplane has almost returned to its normal attitude, and the controls will then be released to permit the aeroplane to continue its movement under its own momentum to normal attitude. It is obvious that the lateral control board 14, and its mechanisms will operate to restore the aeroplane to normal flying position, even though a deflecting effect occurs during a returning movement of the aeroplane to normal from an inclined position. The device is immediately sensible to deflecting movements of the aeroplane, and, as pointed out, operates in three different ways, according to three different degrees of deflection of the aeroplane, thus acting to adjust the controls to restore the aeroplane to normal position, before the deflecting movements may become so serious as to cause accident.

In a deflecting movement which takes place opposite to that described, that is resulting in a depression of the left wing and an elevation of the right wing, exactly the same series of operations take place, except that the gravity acting lever 20ᵇ, the switch contact elements 50ᵇ, 51ᵇ, 52ᵇ, and brush 53ᵇ, and magnetic clutch 46ᵇ, as well as the other "b" connections, enter into the operation.

Although the lateral control board 14, may be adjustable, it, however, should never be necessary to adjust the angle of the same with respect to the aeroplane, for the reason that the said board and its mechanisms will act automatically to insure proper banking of the aeroplane in making a turn, due to the centrifugal force acting upon the gravity acting levers. That is to say, when the proper tilt of the aeroplane has been acquired, due to the lateral swing of the gravity acting levers when a turn is made, the centrifugal force will maintain said gravity acting levers in the same relative position with respect to the instrument board as the levers would have when the aeroplane is flying horizontally and the board is in normal horizontal position, and any deviation from the banking angle will cause a closure of the contacts to set the controlling means of the aeroplane in operation in the same manner as the deflection of the aeroplane from a horizontal flying attitude. When the aeroplane is straightened out upon its course, the centrifugal force of course vanishes, and the gravity acting levers swing downwardly by gravity to close certain of the contacts to thereby operate the controls of the aeroplane to tilt the aeroplane back to a horizontal normal attitude for straight-away flight.

The mechanisms described act under any and all conditions to afford lateral control for an aeroplane for a correct attitude in flight, insuring safe flying. Furthermore, the lateral controls are affected almost instantaneously and exactly to the exact degree or extent necessary to accomplish the result desired, and with but a small fraction of the stress upon the aeroplane and controls therefor resulting from even the most expert manual control.

I am aware that various details of construction may be varied through a wide range without departing from the principles of this invention, and I therefore do not purpose limiting the patent granted otherwise than necessitated by the prior art.

I claim as my invention:

1. In a device of the class described, the combination with an aeroplane and lateral controlling means therefor, of an instrument board mounted transversely of the aeroplane, a plurality of gravity acting levers thereon, electrical contacts on said instrument board, means associated with said board for movement therewith, and relatively movable with respect thereto, electrical circuits adapted to be closed and opened by said levers and by said means, and electrical mechanisms connected to the controlling means of the aeroplane adapted to be set in operation by a closure of said electrical circuits to operate the controlling means and correct deflections in the flight of the aeroplane.

2. In a device of the class described, the combination with an aeroplane and lateral controlling means thereof, of means for automatically operating the same to maintain the aeroplane in stable flying attitude comprising a board mounted within the aeroplane and movable therewith, gravity acting levers mounted on said board, a plurality of contacts associated with said board and levers, certain of said contacts movable with the board into contact with a lever and then held for relative movement with respect to said board, electrical mechanisms adapted to be set in operation by closure and by opening of said contacts, and operative connections between said electrical mechanisms and the lateral controlling means of the aeroplane whereby the latter are operated by said mechanisms when the aeroplane is deflected from its course to correct the deflection thereof.

3. In an apparatus of the class described, the combination with a vehicle and means for controlling the stability or operative attitude thereof, of an instrument board, mechanisms embracing a plurality of independently mounted gravity acting means thereon comprising a main gravity acting lever and a plurality of secondary gravity acting levers, normally open electrical circuits between said main levers and each of said secondary levers, said circuits adapted to be selectively closed by the relative movement of said board with respect to said levers, mechanisms for operating the controlling means of said vehicle, electrical devices adapted when energized to operate said latter mechanisms, and electric circuits between said devices and each secondary independently movable gravity acting means whereby movement of the instrument board effects closure of the second mentioned circuits to operate said devices and cause operation of the controlling means of the vehicle.

4. In a device of the class described, the combination with a vehicle and means controlling the stability and proper attitude thereof, of an instrument board mounted transversely of said vehicle, a plurality of gravity acting means each independently mounted thereon, electrical contacts adapted to be closed and to be opened by relative movement between said gravity acting means and said board, constantly driven electric clutches connected in said electric circuits whereby said clutches may be energized by closure of said contacts, and rack and gear mechanisms connected to the controlling means of the aeroplane adapted to be operated by said energized clutches to correct deflections of the vehicle which cause tilting of said instrument board.

5. In a lateral controlling device for aeroplanes, a board mounted on the aeroplane adapted to tilt therewith transversely about the longitudinal axis of the aeroplane, a plurality of gravity acting means each independently mounted on said board, electrical clutch mechanisms, rack and gear connections between said clutch mechanisms and the controlling means of the aeroplane, and electrical circuits between said clutches and said means and said board.

6. In a stabilizing device for operating the lateral controls of an aeroplane, a board mounted transversely of the aeroplane adapted to tilt therewith about the longitudinal axis of the aeroplane, means for adjusting said board relative to the aeroplane, means journaled on said board adapted to swing transversely of the aeroplane and insensible to longitudinal angular deviations of the aeroplane, constantly driven magnetic clutch mechanisms, gears adapted to be driven thereby when the clutch mechanism is energized, electrical circuits connected between said clutch mechanism and said board and means journaled thereon, whereby relative movement between said journaled means and board affects certain of said circuits to energize a clutch mechanism, and a rack and pinion gear for transmitting the movement from said clutch mechanisms to the controlling means of the aeroplane.

7. In a device of the class described, the combination with an aeroplane and controlling means therefor, of a board mounted transversely of the aeroplane, gravity acting means pivotally mounted on said board, a controlling lever on said aeroplane to operate the controlling means thereof, springs to resist movement of said lever and said controlling means from normal position, a switch mechanism connected between said lever and said controlling means to effect a change in position of the parts of said switch mechanism with adjustment of said lever and controlling means, driving mechanisms to shift said lever and said controlling means, electrical devices for operating said driving mechanisms, electrical circuits connected between said devices and said board and said gravity acting pivotal means thereon to operate said circuits when relative movement takes place between said pivotal means and said board.

8. In a device of the class described, the combination with an aeroplane and lateral controlling surfaces thereof, of a lever for operating said controlling surfaces, electrical devices for operating said lever, a switch mechanism connected to move with movements of said lever, a board mounted transversely of the aeroplane and pivoted thereon, electrical circuits between said devices and said board and a plurality of independently movable electrically connected means thereon, whereby certain electrical circuits are operated when relative movement takes place between said board and means due to tilting of the aeroplane to operate said devices and correct the tilting of the aeroplane by operating the controlling means thereof.

9. In a stabilizing device of the class described, the combination with an aeroplane and controlling surfaces thereof to control the tilting thereof about the longitudinal axis, of an instrument board mounted on the aeroplane transversely thereof, means pivotally mounted on said board permitting relative movement between said board and means, constantly driven electrical devices for operating the controlling surfaces of the aeroplane, contact members movable with said board into contact with said means and then held from movement with said board by said means, and electrical circuits between said devices and said members and the means pivoted on the board whereby said devices may be energized to drive said surfaces with deflections in flight of the aeroplane.

10. The combination with an aeroplane, of a stabilizing device for operating the lateral controls of the aeroplane comprising a board mounted transversely of the aeroplane to move therewith, gravity acting levers on said board, electrical contacts adapted to be operated by relative movement between said levers and board, frictionally mounted pivotal arms associated with said levers and board adapted to move with said board when the same tilts with reference to the gravity acting levers, means on said levers to limit the return movement of said arms with said board as the same returns toward normal position with said aeroplane, electrical devices for operating the controlling means of the aeroplane comprising constantly driven clutches, gear and rack mechanisms adapted to be driven thereby when said clutches are energized to operate said aeroplane controlling means, and electrical circuits between said clutches and said board and the levers and arms pivoted thereon adapted to be operated by relative movement of the parts to energize the clutches and correct deflections in the aeroplane from normal attitude.

11. In a stabilizing device for aeroplanes for automatically operating the lateral controls thereof, a board mounted transversely of the aeroplane and adapted to move therewith, means pivotally mounted on said board for maintaining substantially a vertical position by gravity, frictionally mounted means pivotally mounted in said board to move therewith to a certain extent, and limited from movement away from said gravity acting means, a controlling lever to operate the controlling means of the aeroplane, switch mechanism adapted to move in accordance with movement of said lever, power driven electrical devices connected to operate said lever, electrical circuits between said devices and the switch mechanism and said board and means thereon whereby tilting of a board effects closure of the contacts to energize said devices to operate said lever, said switch mechanism operating to break said circuits when the lever is moved into an extreme position, and means cutting said device entirely out of operation of the aeroplane.

12. The combination with an aeroplane, of mechanisms for operating the lateral controls thereof to maintain the aeroplane in its proper attitude comprising means adapted to operate differently for different degrees of deflection of the aeroplane to restore the same to normal position, comprising a group of gravity acting levers, a board on which each one of said levers is independently mounted, electrical circuits adapted to be operated by relative movement between said levers and said board, electrically operating devices connected in said circuits connected to operate the controlling means of the aeroplane when said circuits are closed, and said levers and board acting to break the electrical circuits during a return movement of the aeroplane to proper attitude prior to complete restoration of the aeroplane to proper attitude permitting the momentum of the aeroplane to continue the corrective movement thereof into proper attitude.

13. A stabilizing device for aeroplanes for operating the controlling surfaces thereof, comprising an instrument board mounted transversely of the aeroplane, pivotal gravity acting means mounted thereon, electrical circuits associated with said means and board adapted to be closed by relative movement between said means and board, constantly driven electric clutches connected in said circuit, gears adapted to be driven when said clutches are energized, a rack adapted to receive movement in either direction through said gears when one or the other of said clutches is energized, connections between the controlling levers of the aeroplane and said rack whereby the controlling means of the aeroplane are operated, and a switch mechanism connected with said lever adapted to break said electrical circuit when an extreme movement has been transmitted thereto.

14. In an automatic stabilizer of the class described, gravity acting mechanism susceptible to tilting movements from normal imposed thereon, electrical terminal contacts associated therewith normally movable relative to said mechanism but when contacting said mechanism stationary with respect thereto and adapted to be opened and closed due to relative movement taking place between said mechanism and terminal contacts, controlling devices in electrical circuit with said mechanism and terminal contacts, and guiding means adapted to be actuated by said controlling devices, said stabilizer adapted to act in a plurality of phases of operation whereby different electrical circuits for different actuation of said means by said devices are opened and closed in accordance with the degree of relative movement between said mechanism and terminal contacts.

15. In a stabilizing device of the class described for a flying machine, the combination with the controls of the machine of gravity acting mechanisms, means connected to operate said controls adapted to be set in operation in different phases according to the degree of relative movement occurring between said gravity acting mechanisms and the flying machine when the altitude of the flying machine is changed and automatic mechanism adapted to effect return of the controls to initial position independently of said means after an adjustment of the controls by said means.

16. In a stabilizing device for flying machines adapted to correct deviations thereof from proper attitude of flight, mechanisms capable of operating in a plurality of different ways according to the degree and intensity of change in attitude of the flying machine, and controlling devices for the aeroplane interconnected with said mechanisms whereby the degree of adjustment of said devices is effected according to the degree of deviation of the flying machine and means connected to said controlling devices whereby said devices are automatically returned to neutral position independently of said mechanisms during a return movement of the flying machine to normal attitude to utilize the effect of momentum of the machine and obviate over-control.

17. In a stabilizing device for an aeroplane, a plurality of co-active independently mounted gravity acting mechanisms constructed to operate differently for different degrees of deviation of the flying machine from normal attitude of flight and to release said controls prior to the complete return of the aeroplane to correct attitude, and means forming a part of said stabilizing device adapted to act independently of said mechanisms to permit the aeroplane to complete a corrective movement thereof to normal attitude by utilizing the momentum of the return movement of the aeroplane.

18. In a stabilizing device for an aeroplane the combination with an aeroplane and its controls, of power means connected to operate said controls, automatically acting mechanisms comprising a control board rigidly associated with and adapted to move with the aeroplane in deflections thereof from normal attitude, and main and secondary control levers maintaining a certain relation to the axis of gravitation attraction on the aeroplane, normally open electrical circuits between said main and secondary levers adapted to be closed by relative movement of said board and levers and thereby effect the control of said power means to effect different adjustments of the aeroplane controls, and independent automatic mechanism for positively returning said controls to normal after an adjustment imposed thereon by said means.

19. In a control mechanism for an aerial machine the combination with the controls of the machine, of power means for actuating the controls, gravity acting pendulum mechanism mounted transversely of the machine susceptible to gyratory movements of the machine about its longitudinal axis electrically connected to cause operation of said means, to effect an adjustment of the controls, and means automatically returning said controls to normal position after an adjustment by said means.

20. A control mechanism for an aerial machine comprising in combination with the controls of the machine, a power means connected for actuation of said controls, gravity acting means comprising a main and a pair of secondary members susceptible to changes in attitude of the machine and electrically connected to cause operation of said power means to effect an adjustment of the controls, and mechanism operating automatically and independently of said means to effect a return of the controls to normal after an adjustment thereof by said power means.

21. In a control mechanism for an aerial machine the combination with the controls of the machine, of a power mechanism connected to actuate said controls, a contact board mounted on the machine for movement therewith, a plurality of gravity acting mechanims pivotally mounted for movement on said contact board transversely of the machine, contact members associated with said board for movement therewith into contact with said mechanisms, and then held stationary with respect to said mechanisms and movable with respect to said board, and connections between said boards, its gravity mechanisms, and said contact members, and said power mechanism.

22. The combination with an aerial machine and its controls, of power means connected to actuate said controls, a contact board mounted transversely of the machine, a plurality of gravity acting members associated therewith, adjustable contacts associated with said board and members adapted to move with either one thereof according to the amplitude of movement of the board, and connections from said board, members, and contacts to said power means to control the operation thereof for actuation of the machine controls.

23. The combination with an aerial machine and its controls, of power means connected to actuate said controls, a contact board mounted transversely of the machine, a plurality of gravity acting members associated therewith, adjustable contacts associated with said board and members adapted to move with either one thereof according to the amplitude of movement of the board, connections from said board, members, and contacts to said power means to control the operation thereof for actuation of the machine controls, and automatically acting means to return the controls to normal position after adjustment thereof by said power means.

24. The combination with an aerial machine and its controls, of a power means connected to actuate said controls, a plurality of independently mounted electrically connected gravity acting members, contacts associated therewith whereby relative movement between said contacts and members effects closure of circuits to said power means to cause operation thereof for an adjustment of the controls, and mechanism for returning the controls to normal position independently of said power means.

25. The combination with an aeroplane, of a stabilizing device for operating the lateral controls of the aeroplane comprising a board mounted transversely of the aeroplane to move therewith, gravity acting levers on said board, electrical contacts adapted to be operated by relative movement between said levers and board, electrical devices for operating the controlling means of the aeroplane comprising constantly driven clutches, gear and rack mechanisms adapted to be driven thereby when said clutches are energized to operate said aeroplane controlling means, and electrical circuits between said clutch and said board and levers adapted to be operated by relative movement of the parts to energize the clutches and correct deflections in the aeroplane from normal attitude.

26. The combination with an aeroplane, of a stabilizing device for operating the lateral controls of the aeroplane comprising a board mounted transversely of the aeroplane to move therewith, gravity acting levers on said board comprising a main lever and a plurality of secondary levers, normally open electrical circuits between said main lever and each of said secondary levers, electrical contacts for said circuits adapted to be closed by relative movement between said levers and board, arms associated with said levers and board adapted to move with said board when the same tilts with reference to said gravity acting levers, means limiting the return movement of said arms with said board as the same returns toward normal, electrical devices for operating the controlling means of the aeroplane comprising constantly driven clutches, gear and rack mechanisms adapted to be driven thereby when said clutches are energized to operate said aeroplane controlling means, and electrical circuits between said clutches and said board and the levers and arms adapted to be operated by relative movement of the parts to energize the clutches and correct deflections in the aeroplane from normal attitude.

27. In a stabilizing device for aeroplanes for automatically operating the lateral controls thereof, a board mounted transversely of the aeroplane and adapted to move therewith, means pivotally mounted on said board for maintaining substantially a vertical position by gravity comprising a main lever and a plurality of secondary levers, frictionally mounted means pivotally mounted in said board to move therewith to a certain extent, and limited from movement away from said secondary levers, a controlling lever for manual control of the aeroplane, switch mechanism adapted to move in accordance with movement of said manual control lever, power driven electrical devices connected to operate said manual control lever, electrical circuits between said devices and the switch mechanism and said board, and means thereon whereby tilting of a board effects closure of the contacts to energize said devices to operate said manual control lever, said switch mechanism operating to break said circuits when said lever is moved into an extreme position, and means cutting said device entirely out of operation of the aeroplane.

28. In a stabilizing device for aeroplanes for automatically operating the lateral controls thereof, a board mounted transversely of the aeroplane and adapted to move therewith, means pivotally mounted on said board for maintaining substantially a vertical position by gravity, a controlling lever to operate the controlling means of the aeroplane, switch mechanism adapted to move in accordance with movement of said lever, power driven electrical devices connected to operate said lever, electrical circuits between said devices and the switch mechanism and said board and means thereon whereby tilting of a board effects closure of the contacts to energize said devices to operate said lever, said switch mechanism operating to break said circuits when the lever is moved into an extreme position.

29. In a stabilizing device for aeroplanes for automatically operating the lateral controls thereof, a board mounted transversely of the aeroplane and adapted to move therewith, means pivotally mounted on said board for maintaining substantially a vertical position by gravity comprising a main lateral control plumb lever and secondary right and left lateral control plumb levers, a normally open electrical circuit between the main lateral control plumb lever and each of the secondary lateral control plumb levers, said circuits adapted to be selectively closed by contact of said plumb levers effected by the movement of said board, and frictionally mounted means pivotally mounted in said board to move therewith to a certain extent, and limited from movement away from said secondary plumb levers.

30. In a device of the class described the combination with an aeroplane and lateral controlling surfaces thereof, of a set of pivotally mounted gravity levers mounted so as to be susceptible to movement of the aeroplane about its longitudinal axis, power mechanisms controlled by said gravity levers and connected to the control surfaces of the aeroplane and a switch mechanism in circuit with said gravity levers and said power mechanism and connected with said power mechanism and the control surfaces of the machine.

31. In combination with an aeroplane its control surfaces and a power mechanism for operating the same of connections between said power mechanism and control surfaces, a switch mechanism operatively associated with said connections for adjustment simultaneously with adjustment of said surfaces by said power mechanism and automatically operating stabilizing devices in circuit with said power mechanism and switch to cause operation of said power mechanism with a tendency of an aeroplane to deviate from normal attitude and restore the same thereto.

32. In a device of the class described the combination with an aeroplane and its lateral control devices, mechanism mounted in the machine susceptible to lateral deviation of the aeroplane about its longitudinal axis, a power mechanism positively connected to the control devices to operate the same, auxiliary mechanism for operating said devices independently of said power mechanism and a switch means in circuit with said automatic mechanism and positively connected with said power mechanism and control devices to be operated coincident with adjustment of the control devices of the aeroplane.

33. In a device of the class described the combination with an aeroplane of a lateral stabilizing device therefor, comprising a power mechanism a sliding switch means positively connected for operation thereby and automatically operating gravity acting means to cause operation of said power mechanism to control the aeroplane.

34. In a device of the class described, the combination with an aeroplane and its control surfaces of an automatic mechanism susceptible to lateral deviations of an aeroplane, power mechanisms positively connected to operate the control surfaces, means interconnected between said power mechanism and said control surfaces for operation coincident with the adjustment of said control surfaces, said means in circuit with said power mechanism and said automatic gravity acting means, and means also connected between said power mechanism and the control surfaces of the aeroplane operating to adjust the control surfaces, upon release thereof from the effect of the power mechanism.

In testimony whereof I have hereunto subscribed my name in the presence of two subscribing witnesses.

ALFRED J. MACY.

Witnesses:
CHARLES W. HILLS, Jr.,
EARL M. HARDINE.